Dec. 13, 1938.  H. D. GREENBERG  2,140,005
DENTAL MIRROR
Filed May 14, 1936

INVENTOR.
Harry Daniel Greenberg

Patented Dec. 13, 1938

2,140,005

UNITED STATES PATENT OFFICE 2,140,005

DENTAL MIRROR

Harry Daniel Greenberg, New York, N. Y.

Application May 14, 1936, Serial No. 79,696

5 Claims. (Cl. 88—104)

My invention relates to improvements in dental mirrors and more particularly to dental mirrors having detachable mirror discs readily replaceable by the operator.

I am aware that detachable mirrors of this character are known in the prior art. However, the replaceable variety are not in use commercially, the present type being limited largely to the metal cup-like frames into which the mirror discs are permanently mounted.

The permanent type of mounting, however, permits water seepage and subsequent clouding in a short period of time, with consequent loss of the entire mounting. Thus, efforts have been directed to the replaceable mirror disc types, wherein the mirror disc may be removed without loss of the mounting. Difficulties were encountered in that where split rings were used hinges were provided which usually broke off or caused tissue irritation. In addition, special attempts were made to render the mounting waterproof, and, as a result special solvents or heating applications were necessary to remove the disc.

Accordingly, one of the primary objects of my invention is to provide a dental mirror of the replaceable type in which the frame and mirror may be assembled with the least amount of manual effort, within the shortest period of time, and without special tools or manipulative methods.

Another important object is to provide a mirror mounting in which the seepage of saliva or of the sterilizing solution will be eliminated.

Other objects are to provide a dental mirror which will have all the advantages recited in the foregoing objects and still retain the same physical appearance and simplicity of the permanent types now in almost universal use, without sacrificing any of the practical features, such as the absence of projecting parts or irritating edges on the mirror frame and handle, which would rub and irritate the tissues of the corners of the mouth, or which would obstruct or impair the direct line of vision during operative procedure.

I accomplish these and other objects by providing a mirror, which, when damaged through any cause can easily be replaced by substituting another mirror in the same frame. I provide in association therewith a replaceable resilient rubber disc and a replaceable metal back portion. I place the combination in a split metal flexible annular frame described hereinafter and lock the entire assembly in an internally threaded handle.

The result is a dental mirror maintaining the desirable appearance of the permanently mounted type and possessing numerous other advantages, such as a low replaceable cost; a waterproof mounting; a renewable mirror disc, rubber disc, and metal backing; and the extreme convenience of installation. Other objects and advantages will become apparent from a consideration of the description taken together with the drawing in which.

Figure 1:
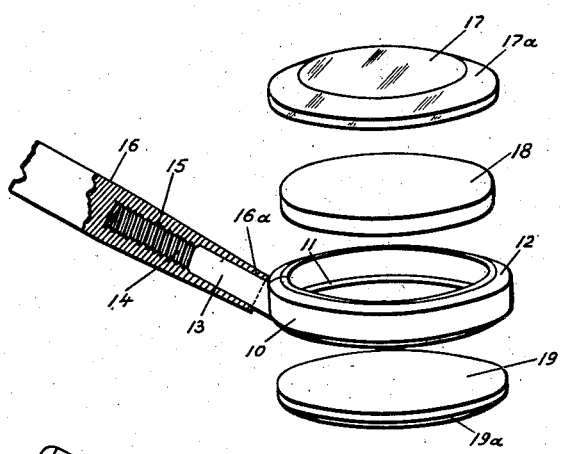
Fig. 1 is a perspective view of my improved dental mirror with the various parts separated.

Reference numeral 10 designates an annular flexible frame with its two rim sections 11 and 12 beveled outwardly and radially towards the center. To the outside of the ring I attach integrally by brazing or hard soldering a short shank 13, externally threaded at 14 for engagement with the internal threads 15 of the handle 16. The shank 13 is inclined to the axis of the frame at a desired angle.

Figure 2:
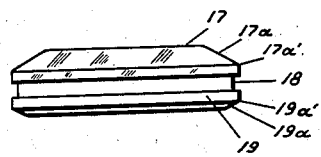
Fig. 2 is a side view of the replaceable mirror disc, rubber disc and metal backing before mounting.

Thereafter the shank and frame are divided or split axially, as in 13a, allowing the frame to be flexibly opened and closed. Mirror 17 of the same internal diameter as the frame and similarly beveled at 17a; a resilient rubber disc 18, having a fractionally smaller diameter than the frame (see Fig. 2); and a metal back section 19 of the same internal diameter and similarly beveled, 19a, as the frame are placed together as a single unit within the frame with the rubber disc between and the bevels facing in opposite directions.

Figure 6:
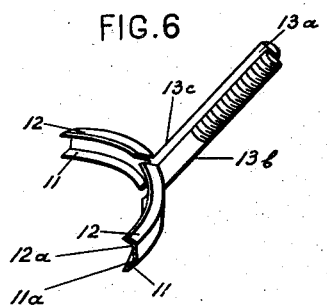
Fig. 6 illustrates a portion of the frame and shank portion, illustrated in Fig. 5, after severing the same.
Figure 5:
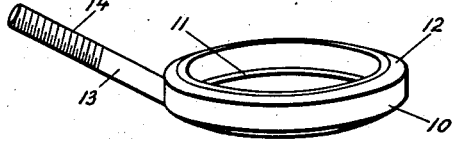
Fig. 5 illustrates in perspective the ring and integral shank portion before severing.

When placed together, the cross sectional width of the unit comprising the mirror, rubber disc, and metal back section, taken on a line joining the two beveled points 17a and 19a of the mirror and back section, is slightly greater than the internal distance between the rim points 11a and 12a of the frame 10, causing the two sections of the shank 13 to be spaced slightly apart, as indicated in Fig. 6. The application of manual pressure will permit the two threaded shank ends 13b and 13c to be inserted into the smooth unthreaded opening 16a of the handle 16, for a short distance, whence they will, after further insertion engage the threaded section 15, as illustrated in Fig. 1.

The purpose of the unthreaded opening is to enable the two shank ends to be quickly and simply locked without immediately attempting to threadedly engage the same, so that the thread engagement can occur without danger of the shank ends coming apart.

As the handle is screwed on tightly over the shank ends, the rubber disc 18, resiliently yields to the wedge-like pressure of the rims 11 and 12 co-acting on the beveled surfaces 17a and 19a, permitting the mirror disc and back section to set uniformly and snugly under the constant pressure within the frame.

The rubber disc is slightly less in diameter than the mirror and back section, so that the pressure will cause an increase in diameter, to fill out the space in the frame, and at the same time hermetically seal the silver coating of the mirror and the adjacent surface of the metal back section against the entrance of saliva or sterilizing solution.

An additional feature may be provided by forming the resilient disc so as to give the two opposite surfaces a slight concavity (not shown). This will enable a suction-like action between the mirror disc and the metal back section, holding the three pieces together as a single unit and providing additional assurance that the pressure along the circumference will be the greatest, thereby rendering an additional seal to prevent moisture seepage.

Figure 3:
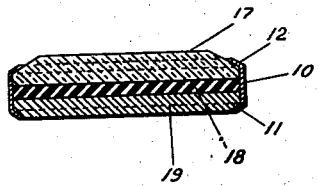
Fig. 3 is a sectional view of the same after mounting.
Figure 4:
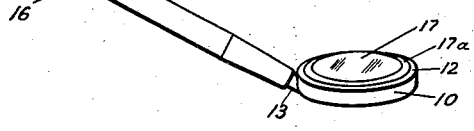
Fig. 4 is a perspective view of the assembled dental mirror.

Inasmuch as the rubber disc is under pressure, it tends to fill out into all the available space, as illustrated in Fig. 3, preventing pockets for collecting moisture.

While the construction is extremely simple, the simplicity is matched by its effectiveness.

The beveled surfaces of the mirror disc, metal back section, and the flexible frame are perfectly aligned and the internal expanding force of the rubber disc effectively seals the assembly, rendering it absolutely moisture tight.

It is free from adhesives which require heat or solvents, which are a nuisance to the average operator and no special manipulative technique is involved.

The mirror disc may be replaced while the patient is in the chair as simply as a new burr is replaced in the handpiece. The absence of airpockets in the mounting prevents the sterilizing solution from getting between the non-absorbent rubber disc and the mirror and backing in the assembly, with subsequent deterioration, as a result of the constant boiling and cooling to which these dental mirrors are subjected. A "fogged" mirror is useless while a scratched mirror is still useable, so that the life of a dental mirror incorporating my invention will last longer than the present types. In eliminating moisture which can often be squeezed out of the ordinary dental mirror, the post-danger of contamination after usual sterilization is eliminated.

Having described my invention, what I desire to claim by Letters Patent is:—

1. A dental mirror comprising in combination a handle internally threaded at one end; a mirror disc beveled circumferentially along one edge; a protective back section similarly beveled along one edge and having approximately the same diameter as said mirror disc; a split, flexible annular frame having beveled rims positioned to fit snugly against the beveled edges of said mirror disc and back section, and having a threaded shank portion attached thereto and divided into two sections to correspond with the two edges of the split frame; a resilient disc positioned between said mirror disc and back section and in direct contact therewith and having a diameter not greater than the diameter of said mirror disc and back section whereby when said shank portion is inserted into said handle the pressure will be transmitted from the beveled rim of said frame to said mirror disc and back section and compress said resilient disc so as to seal the adjacent faces of said mirror disc and back section.

2. A dental mirror comprising in combination a handle internally threaded at one end; a mirror disc beveled circumferentially along one edge; a protective back section similarly beveled along one edge and having approximately the same diameter as said mirror disc; a split, flexible annular frame having beveled rims positioned to fit snugly against the beveled edges of said mirror disc and back section, and having a threaded shank portion attached thereto and divided into two sections to correspond with the two edges of the split frame; a resilient rubber disc positioned between said mirror disc and back section and in direct contact therewith and having slightly concave surfaces and a diameter not greater than the diameter of said mirror disc and back section, whereby when said shank portion is inserted into said handle the pressure will be transmitted from the beveled rim of said frame to said mirror disc and back section and compress said resilient disc so as to seal the adjacent faces of said mirror disc and back section.

3. A dental mirror comprising in combination a handle; a split flexible annular frame having a smooth shank portion attached thereto and terminating in a threaded section longitudinally divided into two sections to correspond with the two edges of the split frame; a mirror assembly for insertion into said split frame; and means at one end of said handle for the insertion of said smooth and threaded shank portions for locking the two ends in position, said means comprising a cylindrical unthreaded guide having a length corresponding to the smooth shank portion of said frame terminating in an internally threaded section for subsequent threaded engagement with said shank portions.

4. A dental mirror comprising in combination a handle, a split flexible annular frame with bevelled edges and having threaded shank portions attached to said frame and divided into two sections to correspond with the two edges of the split frame, a mirror assembly for insertion into said split frame, said mirror assembly comprising a glass disc having a mirrored face and a disc-like separate back section, separated by a resilient intermediate section having a diameter not greater than the diameter of the glass disc and back section inserted between said mirrored face and back section; means for holding said glass disc, back section and resilient intermediate section together so as to form a unitary structure said handle compressing said split frame together to cause the bevels of the frame to compress the glass disc and back section together against said resilient intermediate section.

5. A dental mirror comprising in combination a handle, a split flexible annular frame with bevelled edges and having threaded shank portions attached to said frame and divided into two sections to correspond with the two edges of the split frame, a mirror assembly for insertion into said split frame, said mirror assembly comprising a glass discs having a mirrored face and a disc-like separate back section, separated by a concave resilient intermediate section, having a diameter not greater than the diameter of the glass disc and back section, said section engaging the mirrored face and back section along a peripheral area so as to concentrate the pressure between said faces around the edges of said disks; means for holding said glass disc, back section and resilient intermediate section together as a single unit; said handle compressing said split frame together to cause the bevels of the frame to compress the glass disc and back section together against said resilient intermediate section.

HARRY DANIEL GREENBERG.